United States Patent
Jons et al.

(10) Patent No.: US 7,698,928 B2
(45) Date of Patent: Apr. 20, 2010

(54) METHOD FOR TESTING SEPARATION MODULES

(75) Inventors: Steven Douglas Jons, Eden Prairie, MN (US); Jon E. Johnson, Plymouth, MN (US); Michael A. Fialkowski, Eau Claire, WI (US)

(73) Assignee: Dow Global Technologies, Inc., Midland, MI (US)

( * ) Notice: Subject to any disclaimer, the term of this patent is extended or adjusted under 35 U.S.C. 154(b) by 478 days.

(21) Appl. No.: 11/660,222

(22) PCT Filed: Jul. 29, 2005

(86) PCT No.: PCT/US2005/027132

§ 371 (c)(1), (2), (4) Date: Feb. 13, 2007

(87) PCT Pub. No.: WO2006/026011

PCT Pub. Date: Mar. 9, 2006

(65) Prior Publication Data

US 2008/0105038 A1 May 8, 2008

Related U.S. Application Data

(60) Provisional application No. 60/606,065, filed on Aug. 31, 2004.

(51) Int. Cl.
*G01N 15/08* (2006.01)
(52) U.S. Cl. .......................................................... 73/38
(58) Field of Classification Search ....................... 73/38
See application file for complete search history.

(56) References Cited

U.S. PATENT DOCUMENTS

| 4,980,055 | A |   | 12/1990 | Glazunov et al. |
|-----------|---|---|---------|-----------------|
| 5,538,642 | A |   | 7/1996  | Solie |
| 5,558,753 | A | * | 9/1996  | Gallagher et al. ........... 204/632 |
| 5,674,404 | A |   | 10/1997 | Kenley et al. |
| 5,681,467 | A |   | 10/1997 | Solie et al. |
| 5,736,023 | A | * | 4/1998  | Gallagher et al. ........... 204/524 |
| 6,202,475 | B1 |  | 3/2001  | Selbie et al. |

(Continued)

FOREIGN PATENT DOCUMENTS

| JP | 08252440 | 10/1996 |
| JP | 8252440  | 11/1996 |

OTHER PUBLICATIONS

"Membrane Element Autopsy Manual," Water Treatment Technology Program Report #17, U.S. Bureau of Reclamation, 1996.

(Continued)

*Primary Examiner*—Hezron Williams
*Assistant Examiner*—Rodney T Frank

(57) ABSTRACT

New methods and apparatus are described for assessing the integrity of a separation module or filtration system. A principle embodiment concerns use of a transient pulse of challenge species to probe a spiral wound module. The resulting time-dependent concentration of challenge species in the permeate is detected, recorded, and compared to a reference. An apparatus is further claimed for detecting permeate conductivity at multiple points within the permeate collection tube of a spiral wound module. Also disclosed is a process whereby the permeate stream from a filtration system is concentration by a high recovery membrane apparatus prior to measurement of challenge species concentration.

17 Claims, 14 Drawing Sheets

U.S. PATENT DOCUMENTS

| | | | |
|---|---|---|---|
| 6,228,271 | B1 | 5/2001 | Cote |
| 6,324,898 | B1 | 12/2001 | Cote et al. |
| 6,370,943 | B1 | 4/2002 | Glucina et al. |
| 6,451,201 | B1 | 9/2002 | Cadera et al. |
| 6,632,356 | B2 | 10/2003 | Hallan et al. |
| 6,821,428 | B1 | 11/2004 | Zeiher et al. |
| 6,838,002 | B2 | 1/2005 | Zeiher et al. |
| 7,012,678 | B2 | 3/2006 | Enomoto et al. |
| 7,216,529 | B2 | 5/2007 | Ventreque et al. |
| 7,314,565 | B2 * | 1/2008 | Sabottke et al. ............ 210/640 |
| 7,318,898 | B2 * | 1/2008 | Sabottke ..................... 210/650 |
| 7,357,859 | B2 | 4/2008 | Rajagopalan et al. |
| 2007/0131556 | A1 | 6/2007 | Lambie |

OTHER PUBLICATIONS

J. Lozier, et. al., "Microbial Removal and Integrity Monitoring of High-Pressure Membranes", AWWA Research Foundation, 2003.

M.M. Nederlof, et. al., "Integrity of membrane elements, vessels and systems," Desalting and Water Purification Research Report 55, Bureau of Reclamation.

S. Adham, et. al., Monitoring the integrity of reverse osmosis membranes' Desalination 119, (1998), 142-150.

ASTM D6908-03, "Standard Practice for Integrity Testing of Water Filtration Membrane Sytems", ASTM International, West Conshohocken, PA (Jun. 2003), 1-13).

Laine, J.M. et al., "Acoustic sensor:a novel technique for low pressure membrane integrity monitoring," Desalination 119 (1998), 73-77.

"FILMTEC Membranes: Probing Reverse Osmosis Systems," DOW Form No. 609-00235-0404, Dow Chemical, Midland, MI, (Nov. 1997).

D. Van Gauwbergen, et al., Macroscopic Fluid Flow Conditions in Spiral-Wound Membrane Elements, Desalination 110, (1997), 287-299.

Roth, et al., Sodium Chloride Stimulus-Response Experiments in Spiral Wound Reverse Osmosis Membranes: A New Method to Detect Fouling, Desalination 121, (1999), 183-193.

"Methods for Monitoring the Integrity of Reverse Osmosis Ans Nanofiltration Membrane Systems", Desalting and Water Purification Research Report No. 55, U.S. Bureau of Reclamation, 2000.

Adham, S., et al., "Monitoring the integrity of reverse osmosis membranes", Desalination, Sep. 1998, pp. 143-150, vol. 119, No. 1-3, Elsevier, Amsterdam, NL.

Chapman, M.W., et al., "Methods for monitoring the integrity of reverse osmosis and nanofiltration membrane systems", Desalting and Water Purification Research Report 55, Bureau of Reclamation.

Laine, et al., "Acoustic Sensor: a novel technique for low pressure membrane integrity monitoring", Desalination 1998, pp. 73-77, vol. 119, Elsevier, Amsterdam, NL.

Lozier, J., et al., "Microbal removal and integrity monitoring of high-pressure membranes", WWA Research Foundation, 2003.

Nederlof, M.M., et al., "Integrity of membrane elements, vessels and systems", Desalination, 1997, pp. 179-181, vol. 113, Elsevier, Amsterdam, NL.

Roth, E., et al., "Sodium chloride stimulus-response experiments in spiral wound reverse osmosis membranes: a new method to detect fouling", Desalination, Mar. 1999, pp. 183-193, vol. 121, No. 2, Elsevier, Amsterdam, NL.

Van Gauwbergen, D., et al., "Macroscopic fluid flow conditions in spiral-wound membrane elements", Desalination, Sep. 1997, pp. 287-299, vol. 110, No. 3, Elsevier, Amsterdam, NL.

ASTM D6908-03 "Standard practice for integrity testing of water filtration membrane systems", ASTM Intl., Jun. 2003, pp. 1-13, West Conshohocken, PA.

"FILMTEC membranes: probing reverse osmosis systems" Dow Form No. 609-00235-0404, The Dow Chemical Company, Nov. 1997, Midland, Michigan.

* cited by examiner

METHOD FOR TESTING SEPARATION MODULES

CROSS REFERENCE TO RELATED APPLICATIONS

This application is a 371 of PCT/US2005/027132 filed 29 Jul. 2005, which claims the benefit of U.S. Provisional Application Ser. No. 60/606,065, filed 31 Aug. 2004.

FIELD OF THE INVENTION

The present invention pertains to a method and a device for evaluating the integrity of a separation module or filtration system. The method of this invention is particularly useful for spiral wound hyperfiltration modules and systems comprising these modules. Rapid test methods of the invention improve capability to detect leaks, and are useful for quality testing by module manufacturers. One embodiment also allows leaks in an installed system to be located with no interruption of service. A preferred embodiment determines the location of leaks within a module or within a filtration system, using a non-destructive test.

BACKGROUND

Hyperfiltration is a process whereby pressure is applied to one side of a semi-permeable membrane, causing a solvent (commonly water) to pass through the membrane while a solute (often a salt) is retained. To overcome the natural drive for solvent to move from low concentration to high concentration, the applied pressure must exceed the osmotic pressure. For this reason, the term "hyperfiltration" is often used interchangeably with "reverse osmosis." For purposes of this specification, hyperfiltration encompasses both reverse osmosis (RO) and nanofiltration (NF) processes.

Hyperfiltration membranes are most commonly used in a spiral wound configuration, as this configuration allows a large amount of membrane area to be packed into a small volume. A typical spiral wound module (2) is illustrated in FIG. 1. One or more membrane envelopes (4) and feed spacer sheets (6) are wrapped about a central permeate collection tube (8). The envelopes (4) comprise two generally rectangular membrane sheets (10) surrounding a permeate carrier sheet (12). It is usual that this "sandwich" structure is held together by glue lines (14) along three edges (16, 18, 20) while the fourth edge (22) of the envelope (4) abuts the permeate collection tube (8) so that the permeate carrier sheet (12) is in fluid contact with small holes (24) passing through the permeate collection tube (8). Construction of spiral wound modules is described further in U.S. Pat. Nos. 5,538,642, 5,681,467, and 6,632,356, which are incorporated by reference.

Large arrows in FIG. 1 represent the approximate flow directions (26, 28) in operation for feed and permeate. The direction of feed flow (26) is from the inlet end (30) to the outlet (reject) end (32) across the front surface of the membrane (34). The permeate flow direction (28) is approximately perpendicular to the feed flow direction (26). The actual flow paths and velocities vary with details of construction and operating conditions. Under typical operating conditions, a module might demonstrate feed velocities of 0.15 m/sec and permeate velocities near the tube of 0.04 m/sec. Feed velocities decrease from inlet end (30) to outlet end (32) because some feed liquid is lost to the permeate side. For a well constructed module, permeate velocities similarly increase from the back glue line, where they approach zero, to a maximum velocity at the permeate tube.

Spiral wound modules are generally placed inside of a cylindrical pressure vessel for operation, as illustrated in FIG. 2. It is common that up to eight spiral wound modules (2) may be combined in series within a pressure vessel (40). Pressure vessels (40) have ports (42,43) on both ends for passing feed axially through each of the modules (2) in series and at least one additional port (44) for removing permeate solutions. Permeate collection tubes (8) from adjacent modules (2) are joined by interconnectors (46) having at least one permeate seal (48), and the effect is to approximate one long module within a vessel (40). For the purposes of this specification, a vessel's permeate collection region (50) includes the volume surrounded by permeate collection tubes (8) in series, their interconnectors (46), and their vessel end adapters (52). (Vessel adapters (52) typically join a permeate collection tube (8) to a vessel end cap (54) to allow permeate to exit the vessel.) A pressure vessel can be further combined in series or parallel with other pressure vessels to create a membrane filtration system.

It is typical that manufacturers of spiral wound hyperfiltration modules test modules individually and specify a salt rejection after 20-30 minutes. While small changes in performance may actually continue for days or months, the 20-30 minutes allows measurements to be made under conditions that approximate steady-state. For brackish water modules, a common test uses 2000 ppm NaCl and an applied pressure of 225 psi. Seawater products are typically tested with 32000 ppm NaCl and an applied pressure of 800 psi. FilmTec's NF270 module is tested at 70 psi with 2000 ppm $MgSO_4$. An "intact" module, without membrane or construction defects, typically demonstrates between 0.3% and 3% maximum salt passage in these standard tests. Since hyperfiltration allows some passage of salt through even intact membranes, these tests are not especially sensitive to the macroscopic defects that may result from module construction problems. Further, even when high salt passage is observed, these standard tests provide no information on the type or source of a defect.

As indicated by arrows in FIG. 3, there are several particularly common regions for leaks into the permeate flow path. Regions at the back (60) and sides (62,64) of the permeate carrier sheet (12) correspond to defective glue lines (14), allowing a direct path for feed to enter the permeate. A region (66) near the edge abutting the permeate collection tube (8) corresponds to the membrane fold and has been a common source of leaks, particularly for modules subjected to very rigorous and frequent cleaning cycles. At the inlet and outlet ends of the module, near the permeate tube (8), regions (68, 70) corresponding to insert leaks (where a leaf pulls away from the module in construction) may cause high salt passage. The membrane itself may also generally have high salt passage or it may have localized defects such as scratches and pinholes, and these may result in feed liquid passing into the large center region (72) of the permeate channel.

The location of defects within a spiral wound module can be difficult to discern. In some cases, autopsy and dying can reveal the position of defects ("Membrane Element Autopsy Manual," Water Treatment Technology Program Report #17, U.S. Bureau of Reclamation, 1996). However, autopsy is a destructive and time consuming procedure, and the delay associated with obtaining results means that it rarely results in information that can be used to correct an existing problem in fabrication.

Hyperfiltration modules are most commonly used to remove salts from water. These membranes also remove specific larger impurities of interest (e.g. Giardia, Cryptosporidium, viruses). Thus, hyperfiltration can produce potable water from surface water while limiting the need for disinfectants. These membranes are also used to treat municipal waste waters for direct and indirect potable reuse. However, due to concerns over integrity, hyperfiltration is always one of several steps used to treat these waters, and its actual impact on the removal efficiency for larger particles is generally undetermined.

Complete removal of any species by membranes requires both that all of the product water pass through the barrier layer and that the barrier layer is defect-free. J. Lozier et al. teach that key areas for virus and cyst passage within a hyperfiltration module as imperfections in the membrane sheet, imperfections in the glue or heat seals of the membrane leaf, and imperfections in the membrane at the area of attachment to the product water tube. (J. Lozier, et. al., "Microbial Removal and Integrity Monitoring of High-Pressure Membranes", AWWA Research Foundation, 2003). The standard salt rejection test used by manufactures lacks the sensitivity to detect the defects that are more prone to passing larger particles. Additionally, several primary causes for leaks are external to modules, particularly the interconnectors that join adjacent modules and connect modules to external piping. An effective test method to be used in systems would need to evaluate the module and all components surrounding it. The test would also ideally not interrupt system operations, not only because of resulting decreased productivity, but also because spiral wound modules are most reliable when operated continuously.

In recent years, a number of methods for testing integrity of UF, MF, and RO systems have been proposed and demonstrated, and these have been reviewed in several publications. See, for example, Lozier, et. al., op. cit.; M. M. Nederlof, et. al., "Integrity of membrane elements, vessels and systems," Desalination, 113 (1997), 179-181; M. W. Chapman, et. al., "Methods for monitoring the integrity of reverse osmosis and nanofiltration membrane systems," Desalting and Water Purification Research Report 55, Bureau of Reclamation; and S. Adham, et. al., "Monitoring the integrity of reverse osmosis membranes" Desalination 119, (1998), 143-150.

The integrity of modules is often assessed by means of air flow measurements. These air flow tests are usually based on the bubble point method, and variations have been described in several patents. See, for example, U.S. Pat. Nos. 6,202,475, 6,228,271, 6,324,898. Pressure or vacuum is applied to one side of the membrane, causing air to flow freely through large holes. With hyperfiltration modules, a standard test method is to apply vacuum on the permeate side of the membrane and observe air passage as decay in that vacuum over time. (ASTM D6908-03, "Standard Practice for Integrity Testing of Water Filtration Membrane Systems", ASTM International, West Conshohocken, Pa., (June 2003), 1-13) This may be done with wet or dry modules. However, this standard method is generally limited to detecting holes greater than about 2 microns, and a system must temporarily be taken off-line to be tested. In some cases, air flow tests can provide information about the approximate location of leaks within a system and even within a module. For instance, pressurizing the permeate tube of a wet spiral wound hyperfiltration module may result in bubbles at the scroll end with positions indicative of certain leak types. However, this method is time consuming and difficult to automate, and its sensitivity is greatly limited by the low pressures required to avoid membrane delamination.

Laine et al. teach use of an acoustic sensor to detect cut fibers in UF systems. (Laine, J. M. et al, "Acoustic sensor: a novel technique for low pressure membrane integrity monitoring," Desalination 119 (1998), 73-77.) An advantage of this test is that a system can continue to produce treated water as while the system is evaluated. Holes with 0.5 mm diameter may be detected, but sensitivity depends strongly on background room noise; further, the process only works during dead-end filtration. In addition, the method of Laine et al. provides some information on approximate leak location using a separate sensor on each module. However, it is not clear that acoustic sensing could be effectively adapted to cross flow spiral wound modules; it would certainly not detect the wide range of hole types and sizes that are present in hyperfiltration modules.

A variety of natural constituents of feed water have been used to continuously monitor for anomalies in membrane systems. Chapman, et. al, teaches indicators of new system leaks include increased levels of particle counts, TOC, turbidity, TDS, divalent anions or cations, colored substances detected at 455 nm, and substances detected at 254 nm (organics, humic and fulvic acids). Particle counting is one of the most common methods employed in MF/UF systems, but this would not be as appropriate for hyperfiltration when feed water has been pre-treated. For each of these methods, sensitivity depends on the constituents in the natural feed water and their consistency over time. Due to changing membrane, changing feed, or changing process conditions, small changes in performance are difficult to perceive.

ASTM standard (D 6908-03) incorporates the teachings of Chapman, et. al. and Lozier et. al., where a well rejected challenge species, that is also easily detected in the permeate, is added to the feed. Chapman challenged RO membranes with Allura Red (FD&C #40). Lozier has mixed in both Rhodamine WT and 0.02 micron fluorescent microspheres into system feeds. As recommended in the ASTM standard, permeate samples were collected after modules had been running on the challenged feed for substantial time to obtain relatively static conditions. System leaks were indicated by an elevated ratio of permeate to feed concentration. Chapman and Lozier both found that dye tests were capable of detecting some large leaks but tests were not sufficiently sensitive to unambiguously detect all defects. For hyperfiltration membranes sensitivity of dye tests is limited by diffusion of dye through the membrane and by issues with disposal of high concentrations of reject solution. Use of fluorescent microspheres is prohibitively costly at present. These challenge tests provide only a single value to indicate failure, and this number gives no information about leak location.

Particularly when other measurements suggest there is reason to suspect that a particular vessel of spiral wound modules has integrity issues, a probing conduit may provide a means to localize a problem to a particular module. A publication ("FILMTEC Membranes: Probing Reverse Osmosis Systems," DOW Form No. 609-00235-0404, Dow Chemical, Midland, Mich., (November, 1997)), describes how a tube may be inserted into the vessel, down a series of connected permeate tubes, so that water may be diverted and analyzed from a particular section of the vessel's permeate collection region. Unfortunately, the process is time-consuming and requires taking the system off line if adapters are for the probe are not present.

There is a need is for an improved method of detecting leaks in individual spiral wound hyperfiltration modules. This test should be particularly responsive to macroscopic module construction defects that allow passage of viruses and bacteria, but also sufficiently sensitive to detect small holes that might notably increase salt passage. There is also a need for a method that verifies the integrity of a hyperfiltration system in the field, without interrupting water production. For both cases, it is desired that tests be more rapid and have higher sensitivity than existing options. Preferably, tests would indicate the existence of a leak, and also provide information regarding the location and cause of this leak.

SUMMARY OF INVENTION

Our invention provides an improved method and apparatus for rapidly evaluating the integrity of a filtration system. The method of this invention may be applied to test either a single module or a system of modules, and disclosed methods can be performed without depressurizing a system. In one embodiment, production of potable water may be continued during the testing process. Another embodiment provides a probe array for measuring the change in concentration of a challenge species in a permeate stream in a module. Yet another embodiment provides a device for measuring low concentrations of a challenge species in a permeate stream of a filtration system.

We have discovered that improved sensitivity to defects results from testing of spiral wound modules by introducing to the feed stream of a module a short pulse of a challenge species that is well-rejected by the membrane and measuring the time-dependent concentration of challenge species that results within the permeate stream. The resulting time-dependent permeate signal may be detected, recorded, and compared to a reference. As compared to conventional integrity tests performed when the permeate concentration is in quasi-steady-state, this time dependence of permeate signal can provide improved differentiation, allowing leaks to be more readily discovered. The method is applicable to feed pulses of challenge species added over a period as long as four minutes but more preferably uses substantially shorter pulse durations of less than or equal to two minutes or even more preferably less than or equal to 40 seconds or less than or equal to 5 seconds, to obtain permeate responses characteristic of "intact" and leaking filtration systems. Using a non-steady-state permeate concentration enhances permeate signal against a variable background due to the short measurement time interval and it also enhances signal because the response from defects can be concentrated in a short time compared to passage of challenge species through "good" membrane. In addition, a non-steady state allows high concentrations of challenge species to be used in the pulse, even in cases where the osmotic pressure approaches or exceeds the applied pressure. In a preferred embodiment the challenge pulse may temporarily increase osmotic strength to dramatically reduce the system's net driving potential and enhance the magnitude of signal from leaking regions. The method of this invention has an additional advantage of allowing collection and re-use of a substantial fraction of the rejected challenge species.

We have further found that measuring the concentration of challenge species at several positions along the permeate tube within the module provides improved sensitivity to defects. The concentration at each measurement point along the permeate tube varies as a function of time, as the feed with concentrated challenge species traverses the length of the module and as permeate moves down the permeate carrier sheet. Another embodiment of this invention includes a means to measure conductivity from at least four points within a vessel's permeate collection region. Particularly in combination with a short pulse of challenge species, the claimed device can provide substantially improved sensitivity to defects, and may allow both the location, and in some cases even cause, of defects to be ascertained in a non-destructive test. When used with either a single module or multiple modules within a vessel, the probe device is preferably adapted to detect leaks from interconnector seals upstream of one module. When used with multiple modules inside a vessel, the probe is most advantageously combined with interconnectors that avoid constricting the inner diameter of the vessel's permeate collection region.

Another embodiment of this invention includes a device for sampling the permeate stream of a filtration system, concentrating a challenge species within that stream using a high recovery membrane apparatus, and then detecting the challenge species within the high recovery membrane apparatus' reject solution that would otherwise be more difficult to measure. Since the claimed device provides a means for continuous concentration and detection of challenge species, it can be very advantageously combined with the pulse test to improve sensitivity. The device's high recovery membrane apparatus preferably includes a feed spacer having substantially decreased cross sectional area at its outlet end.

BRIEF DESCRIPTION OF FIGURES

Reference numerals within figures correspond to like numerals within parenthesis in the text of this specification.

DETAILED INVENTION

This invention focuses on improved testing methods for evaluating the integrity of spiral wound modules and systems containing those modules.

Figure 4:
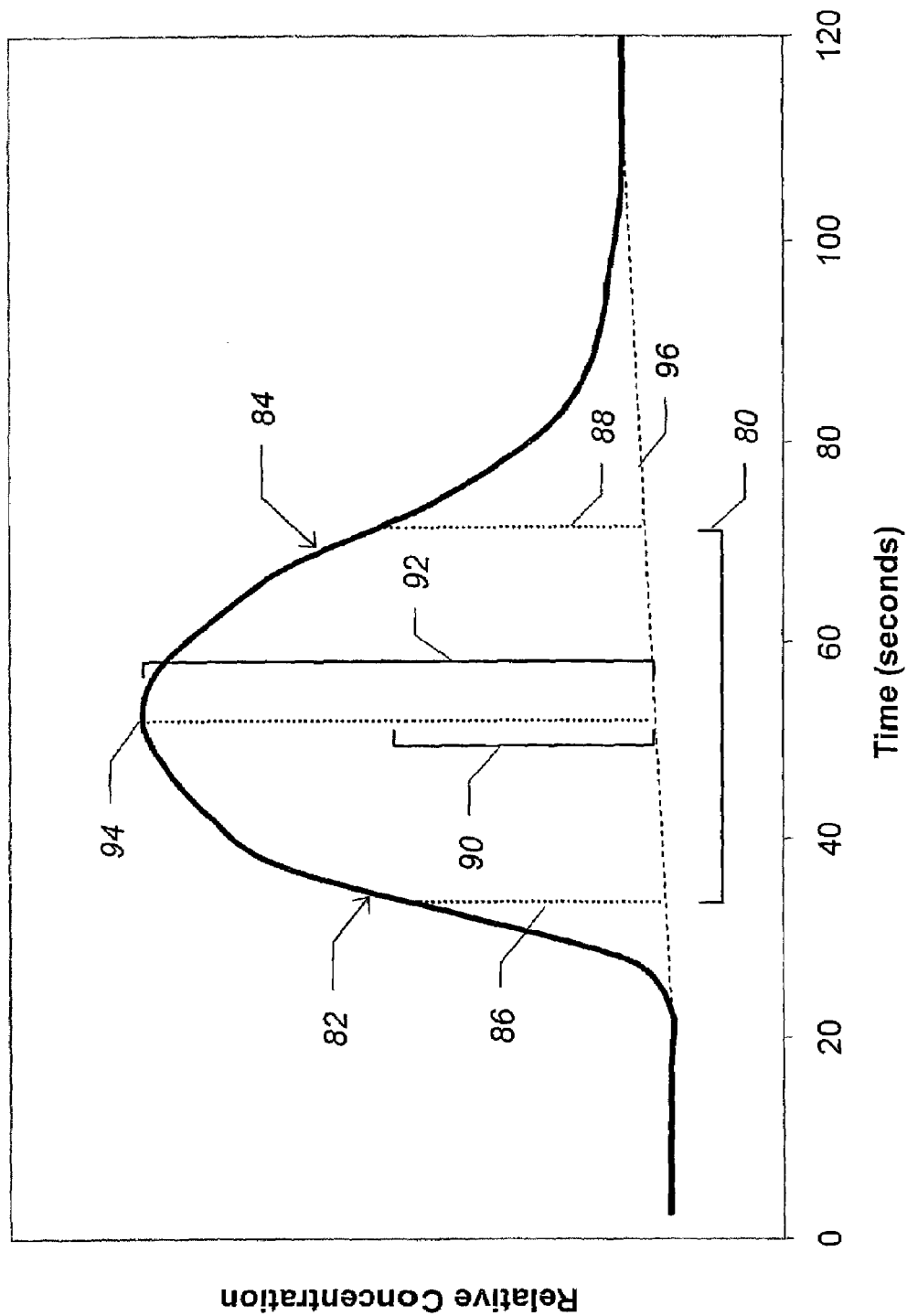
FIG. 4 shows a graph of relative challenge concentration in the feed verses time, and it illustrates how the FWHM (full width at half maximum) may be calculated for a pulse.

It is one aspect of this invention that the integrity of a filtration system comprising at least one spiral wound module be assessed by operating the system under pressurized liquid, as in filtration, and causing a short pulse of a well-rejected challenge species to pass across the membrane. This pulse may be produced by switching between liquid feed sources or by injecting a concentrated solution of challenge species into a continuous feed solution. In either case, a first feed liquid is replaced by a second feed liquid of higher challenge concentration, and the second feed liquid is replaced by a third feed liquid. (Replacement of the feed liquid in this invention does not require plug flow. It is, for instance, within the scope of this invention that feed liquid within a module may contain residual constituents from an earlier feed liquid. Also, the first and third feed liquids may be the same solution.) The resulting pulse duration could be characterized by any one of a number of ways; we have chosen the FWHM (full width at half maximum). As seen in FIG. 4, this FWHM is the length of time (80) separating the rising (82) and falling (84) edges of a peak in challenge concentration, measured between times (86, 88) corresponding to a challenge concentration that is half (90) the maximum increase (92) from peak (94) to baseline (96). In most systems, this FWHM will approximately correspond to the difference in times between events (e.g. opening/closing valves or turning on/off injection pump) defining the second feed.

In a preferred embodiment the maximum concentration of challenge species in contact with the membrane during the pulse should be at least twice that in the original and final feed liquids, although it is most preferred that the original feed liquid not contain any of the challenge species. The challenge species averages at least 97% rejection at regions of intact membrane during the test, corresponding approximately to the maximum 3% salt passage in the previously mentioned standard tests. However, much higher rejection (greater than 99%) would provide better sensitivity. Because concentration polarization of the challenge species can be difficult to estimate accurately within a module, this average rejection at the intact membrane's surface is specified as an apparent rejection that accounts for increased feed concentration due to recovery but does not take into account polarization.

Figure 1:
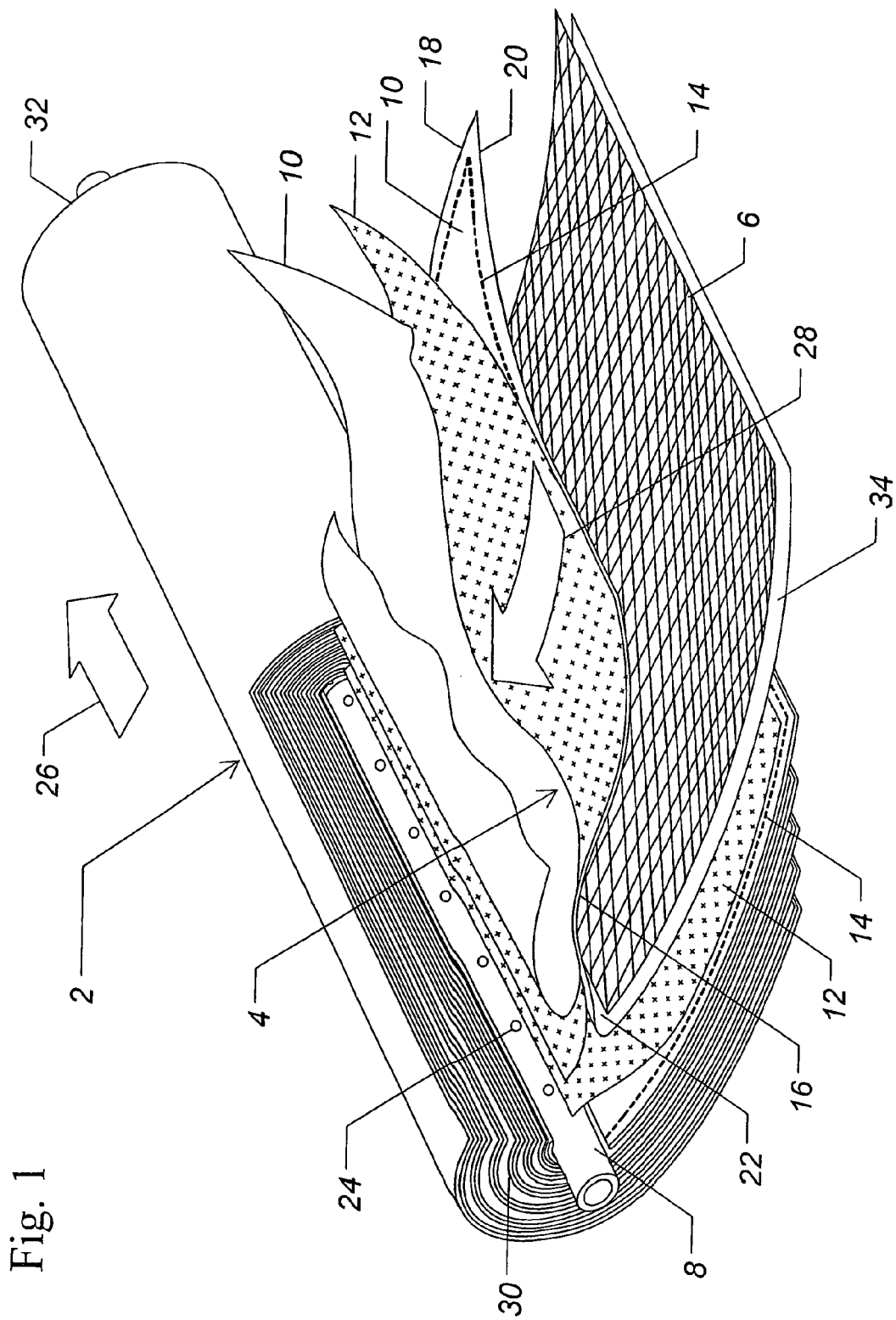
FIG. 1 is a perspective, partially cutaway view of a typical spiral wound module.
Figure 2:
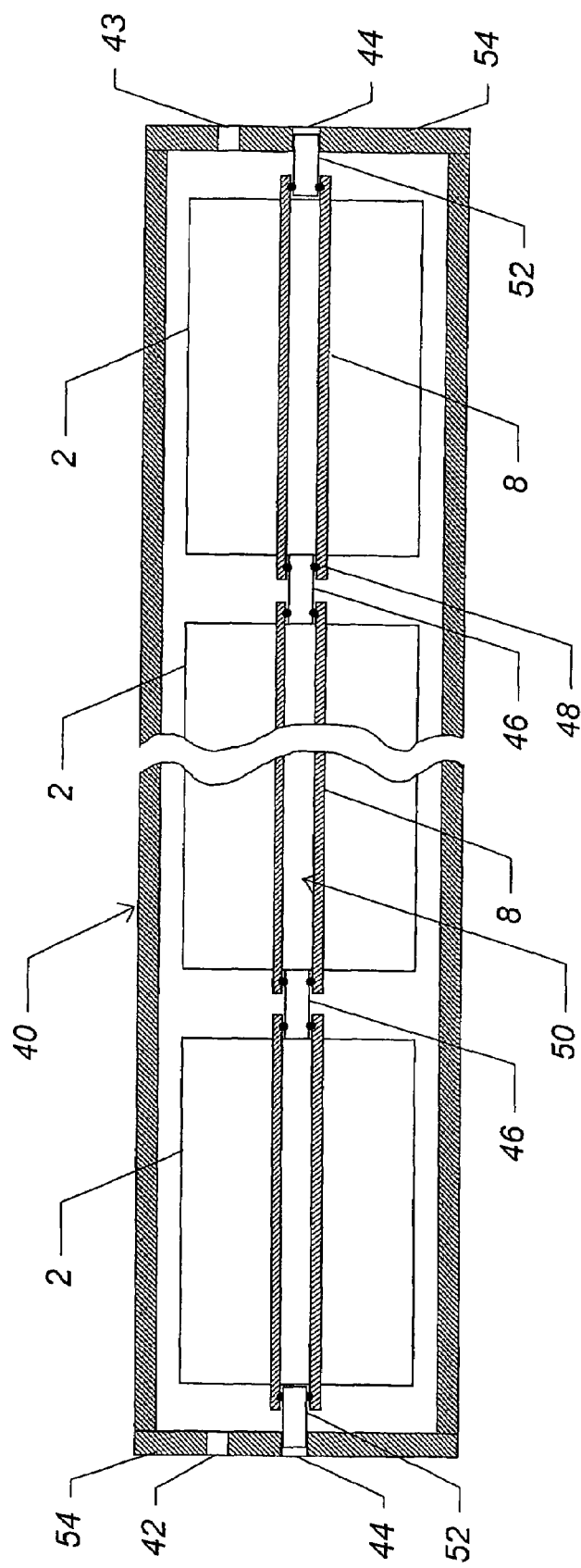
FIG. 2 is a partial cross section of a typical vessel containing modules in series.
Figure 3:
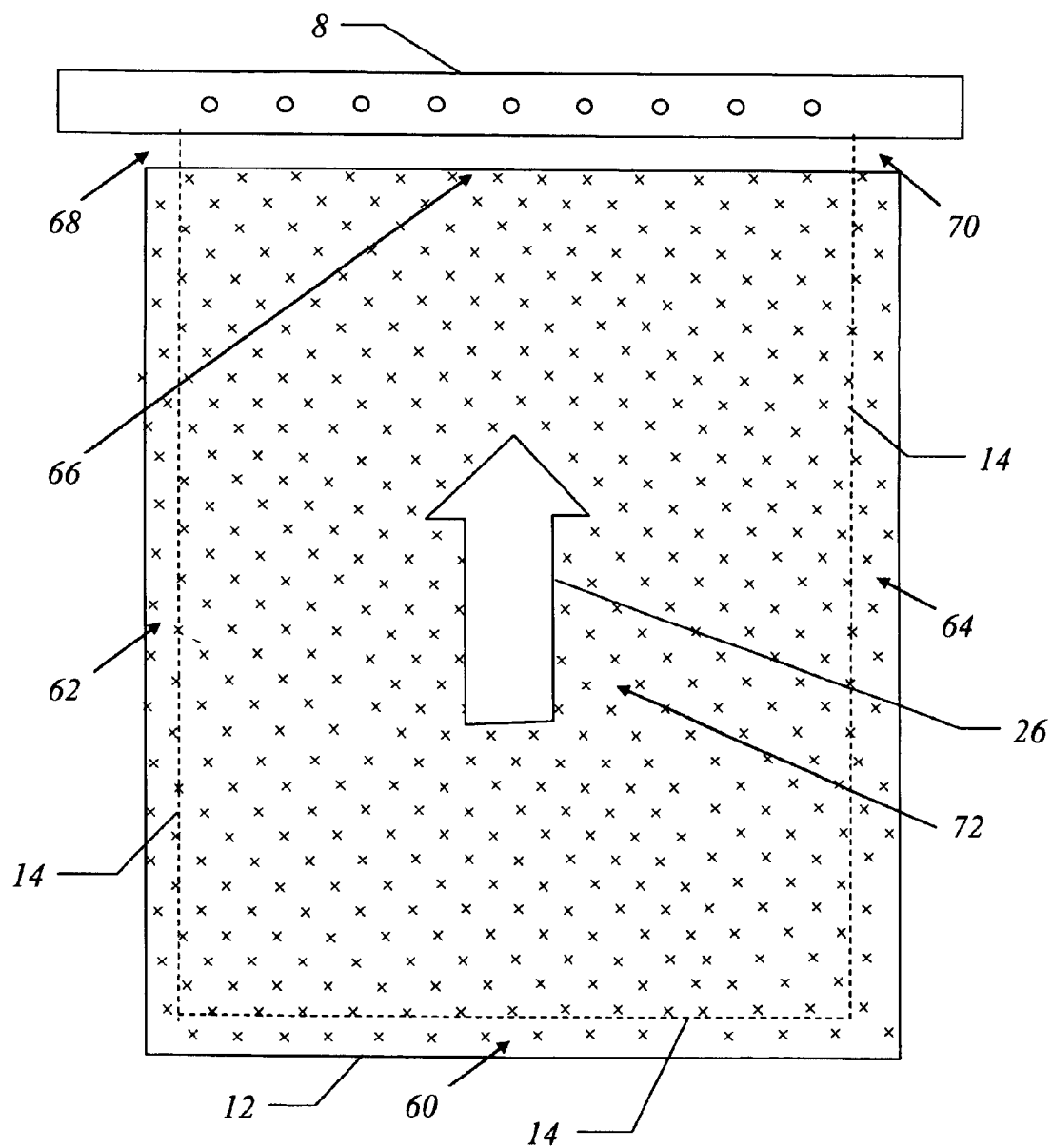
FIG. 3 shows a permeate carrier sheet and permeate collection tube, and common regions for leaks into the permeate flow path are indicated by arrows.

We have discovered that a short pulse allows the opportunity to distinguish between some types of defects. Any of the defects in the regions described in FIG. 3 may alter flow and challenge concentration within the permeate channel. However, a standard test combines the permeate from all regions, so all defects evidence themselves only as an increase in average salt passage. By contrast, the elution profile after a short pulse can differentiate between leak regions. For instance, leaks at the back glue line will take substantially longer to elute from the module than leaks near the permeate tube. (The actual time for a leak at the back glue line to elute depends on its size, as its presence modifies flow paths and velocities within the permeate channel.) Similarly, a difference in time profiles can be seen for leaks originating near the inlet and outlet ends of the module. This difference is caused by both the time required for feed liquid to move across the module and the time required for permeate liquid to leave the module from one end. In typical operation, the latter effect dominates, but their impacts can be combined by removing permeate from the inlet side of the module. Examples will show how localized defects may evidence themselves as a discrete spike in permeate concentration with time. By contrast, an intact module made from membrane having generally higher passage of the challenge species can be expected to have a fairly typical time profile, although its magnitude of challenge passage will be higher than normal.

It is desirable that the concentration of challenge species in both the feed and permeate be detected and recorded as a function of time. (Digitally recording this signal as a function of time allows a computer to process results and evaluate by comparison to a reference.) The feed pulse should have a concentration profile in time characterized by a FWHM of less than four minutes, preferably less than two minutes, and more preferably less than one minute. The permeate signal is preferably detected and recorded at intervals of less than 10 seconds. Even more preferably, the signal is detected and recorded at intervals of less than 2 seconds, especially since this may be required to accurately determine intensity at peak. Using only the time-dependent relative concentration of challenge species within the permeate, it is possible to note variations in the profile that are characteristic of defects. More accurate information on leaks can be obtained by using additionally the absolute magnitude of this signal (and relating it to challenge concentration in the feed) and/or more precise information about separation in time of the permeate pulse profile from the feed pulse profile.

To evaluate the integrity of a filtration system (including a system composed of a single module), it is desired that the recorded data be compared to a reference. The reference may be obtained using data collected previously on the same system (with the same vessels and modules) or using data collected previously on one or more essentially equivalent systems (systems with essentially the same system configuration and same type of modules as the system being evaluated). The reference may also be derived using the performance of "intact" modules or vessels, as determined experimentally or by computer simulation. Similar to system simulation software provided by manufacturers of hyperfiltration modules, a program would preferably take into consideration operating conditions such as number of type of modules in series, water flow into a vessel, and vessel recovery. (As is understood in the art, these considerations may take other forms, such as applied pressure and membrane permeability.) Additionally, simulation software would use information on the duration of a pulse, and more preferably incorporates data on measured feed profile. On the basis of the reference, integrity of a module or system may be evaluated. This information may be used to direct appropriate disposition of modules and determine corrective action as warranted.

We have found that another advantage of testing modules using a short pulse in feed liquid concentration is that improved signal to noise ratios may be obtained. When a module is tested according to standard methods, it is commonly the case that excess conductivity is due to defects measured against a large and varying background signal. The background signal may vary due to leaching of conductive species or due to changes in membrane rejection with time. Either way, a test using a short pulse in feed concentration can be less sensitive to varying background levels because changes in permeate concentration are observed over a much shorter time. Similarly, a rapidly pulsed feed may allow greater sensitivity to defects in membrane systems composed of several modules. (It has been commonly difficult to detect defects in systems by traditional monitoring methods because the continuous measurements typically acquired in the field are commonly obscured by variation in membrane, feed, and process conditions.)

We have found that obtaining steady-state performance is not required for a sensitive integrity test. In fact, the transient pulse method of this invention can actually provide increased sensitivity as compared to steady-state performance. Performance of hyperfiltration modules is known to change with test duration. Standard tests recommended and performed by manufacturers of hyperfiltration modules require measurement of salt passage after a substantial warm up period, usually specified as 20 or 30 minutes, so that stabilized membrane performance may be measured. The new ASTM method (D6908-03) for dye integrity testing suggests that a system should be run to achieve equilibrated performance, dye should be added, and then it specifies an additional 15 minutes to re-achieve equilibrium before samples are taken and dye passage is calculated. It is also the case that a steady-state distribution of solution within the permeate carrier sheet is further prevented at much shorter times by the need to void the permeate channel. The required time to do this is approximately inversely proportional to a module's flux. In a non-leaking typical spiral wound module operated at 5, 10, and 20 gfd (8.5, 17, and 34 $l/m^2$ hr), times of 4 minutes, 2 minutes, and 1 minute roughly correspond to twice the time for permeate to pass 90% down the length of permeate sheet and enter the permeate tube. Our proposed test with a rapid pulse of challenge species does not require a substantial warm up and, in at least some cases, it is believed to be more effective at detecting defects because steady-state performance is not achieved.

A surprising discovery of the present work is that a short feed pulse, creating a module test condition that is not in steady-state, allows hyperfiltration tests to use both high challenge concentrations and low applied pressures. Higher challenge concentrations increase sensitivity against existing background signals and low detection limits. Low applied pressures decrease the costs of pumps and piping. In a steady-state process, membrane flux is decreased by trans-membrane osmotic pressure, and zero flux is approached when applied pressure is reduced or feed concentration is substantially increased. Therefore, at a given applied pressure, a practical upper bound exists for the concentration of well-rejected challenge species. However, in the case of a rapid pulse in feed concentration, time-average flux through the membrane is principally determined by feed conditions before and after the pulse. This allows a much higher feed concentration to be used during the pulse without a severe loss in permeate flow. It further allows challenge species to be concentrated within the permeate channel, resulting in a larger signal upon resumption of standard flux.

We have discovered that another advantage to using a short pulse is that rapidly changing osmotic pressure can, at least in some cases, provide a substantial increase in sensitivity to defects, particularly as the net driving potential approaches zero or becomes negative. Net driving potential is defined as the sum of the applied pressure minus the osmotic pressure difference across the discriminating membrane, and it may become negative when concentration at the front surface of the membrane is large. (As a pulse may contain more than one constituent of increased concentration, it is not required that the detected challenge species is primarily responsible for the increase in osmotic pressure.) While not limiting the utility, one hypothesized mechanism to account for the increased sensitivity is as follows: During the pulse, when feed concentration is high, water flux and challenge solute flux through holes (even quite small holes) is driven by applied pressure and is not hindered by feed osmotic pressure. Regions of the permeate carrier sheet near defects may become loaded with challenge molecules during the pulse, and these are then flushed from the module and toward the detector after the pulse. By contrast, a high feed concentration (corresponding to high osmotic pressure) during the pulse substantially limits the water flux through "intact" hyperfiltration membrane. As flux approaches zero in these regions, and particularly when net driving potential becomes negative so as to reverse flux, convective transport of challenge species at the backside of the hyperfiltration membrane may be dramatically decreased and the movement of challenge species through the "intact" discriminating membrane can be substantially lessened. As described above, it is possible to test with a pulse causing negative net driving potential because the average flux and flow through the permeate channel are still dominated by conditions before and after the pulse.

In another preferred embodiment, a short pulse containing challenge species may be contained within a longer duration pulse of high osmotic strength. For instance, a high osmotic strength solution may be injected into a system's standard feed solution (e.g. from t=0 to t=60 seconds) and an easily detected challenge species may be injected into the same solution for less time (e.g. from t=15 to t=45 seconds). A conventional dye test is commonly limited in sensitivity by a background signal from diffusion through intact membrane, so surrounding a pulse of dye by a high osmotic strength pulse, particularly one that causes reverse flux, could improve sensitivity to leaks. As compared to a single pulse containing both challenge species and high osmotic strength, this approach reduces passage through "intact" membrane at the pulse edges.

In some cases, spiking the feed with a short pulse of challenge molecules can allow use of existing, cheap detectors. In one preferred embodiment, a feed solution is spiked with sulfate ions. Divalent anions such as sulfate are well-rejected by most hyperfiltration membranes. A time-dependent change in permeate conductivity allows sulfate leakage to be differentiated from background conductivity levels. As a manufacturer's module test, this allows integrity to be evaluated despite leaching of other conductive materials and a variable membrane salt passage. In a filtration system, such as a water treatment plant, a short pulse of sulfate ions could be distinguished from a continual presence of conductive species in the permeate. This test would not introduce prohibited species to the feed or permeate, and a short pulse would allow evaluation of integrity without interrupting water production. A similar test could also be performed by spiking other challenge materials frequently present and detected in filtration systems (particles, TOC, etc.)

Another advantage to using a short challenge pulse is that less solute is used in the test. The pulse time can result in reduced time-averaged discharge levels (waste), as compared to a steady-state test. Further, when feed concentrations are limited by an average discharge level (even over a relatively short period of time), short pulses can allow for higher feed concentrations and improved signal to noise. The short pulse also results in a lower time-average concentration of material in the permeate.

A short pulse further allows reject solution during a pulse of high challenge concentration to be physically segregated and can enable substantial recovery of the challenge species. For instance, in a filtration system with 85% recovery, a short duration of reject solution could have more than six times the original feed concentration, and this rejection solution may be sent to a storage tank for re-use. Actual recoverable concentrations will often be less due to lower system recoveries and mixing at the pulse ends. Still, recovery and re-use of challenge species would be particularly beneficial for expensive materials such as the fluorescent particles described earlier.

It is another aspect of this invention that the concentration of a challenge species in the permeate of a membrane (MF, UF, NF, RO) module or system may be increased prior to detection by passing a sampling of this permeate stream, representative of the whole permeate stream, through a subsequent high recovery filtration apparatus. In that case, the sampled permeate stream is re-pressurized, if necessary, and becomes the feed to a high recovery apparatus. The reject stream from the high recovery apparatus is then sent to the detector. It is desirable that recovery be at least 95% and more preferably at least 99%, resulting in twenty times and one hundred times increased signal at the detector. Concentrating the challenge species is particularly useful when the original permeate concentration is not easily measured with accuracy, such as when its concentration is less than 100 times, or even less than 20 times, the detection limit.

Concentration of a sampling stream in this manner may be accomplished by dead end or cross flow filtration. Especially when the challenge species is a particulate, dead end filtration can be used to concentrate the particles within a volume of the sampled permeate onto a membrane surface, and this surface may then be analyzed. Particularly high sensitivity is possible if individual particles, such as magnetic or fluorescent particles, can be separately counted. A preferred detection apparatus that may be used in conjunction with a feed pulse would include sampling lines from the permeate streams of one or more vessels, an automated means for collecting permeate samples during a specified time following a feed pulse, a storage reservoir for holding sampled permeate from each sampling line, separate flat membrane sheets corresponding to each reservoir that retain the challenge species in dead end filtration, a means for applying a differential pressure across each membrane sheet, and at least one automated detector that quantifies and records the amount of challenge species retained on a membrane surface. Because rapid analysis time is important, it is preferable either that each sampling line have a corresponding detector or that a single detector be programmed to automatically quantify challenge species content on several membrane surfaces in sequence. If a fluorescent challenge species is used, including a molecular species that is retained on the membrane by adsorption, an automated detector preferably includes an excitation laser, most preferably near 532 nm, and an optical filter that rejects scattered excitation light and passes longer wavelengths. Concentrated adsorbed particles may be released from the surface by addition of a small amount of appropriate solvent prior to measurement.

Concentration of a sampling stream by cross flow filtration, as opposed to dead end filtration, is more conducive to a real time analysis of concentration. Therefore, a cross flow geometry may advantageously be combined with measuring the time dependence of permeate signal following a pulse in challenge concentration. In a pressurized cross flow filtration, pressure on the high recovery membrane may be maintained by a resistance to reject flow, prior to or after the detector. Alternatively, flux across the high recovery membrane may be created by application of vacuum on the permeate side. An MF or UF membrane is particularly conducive to vacuum filtration.

An apparatus to increase signal from a sampled permeate stream may use RO, NF, UF or MF membrane. However, membrane in the high recovery filtration apparatus must be highly rejecting of the challenge species of interest. A UF or MF membrane may be appropriate for concentration of some particles, but a hyperfiltration membrane will be needed to concentrate smaller species, and particularly salts. Use of a detection system or method that incorporates a high recovery NF membrane can have particular advantage when used to evaluate the integrity of RO or NF systems. (As described in U.S. Pat. No. 5,858,240, NF membranes are specifically distinguished by the fact they substantially pass some salts while other salts, particularly those with multivalent species, are selectively retained.) The permeate stream from RO and NF systems commonly contains salts, but these are generally dominated by the monovalent ions that NF preferentially passes. Consequently, an NF membrane may be used to greatly concentrate a divalent challenge species, such as sulfate, sulfite, and phosphate, while keeping the background conductivity levels and osmotic strength low.

This method of determining the concentration of a particular challenge species in the permeate after concentrating a sampling of the permeate with a high recovery filtration apparatus may be used with a variety of different detectors and challenge species. Detection methods include, but are not limited to, measurements of specific ion concentration, conductivity, TOC (Total Organic Carbon), turbidity, particles, absorbance of light, or fluorescence. It can be used with both naturally occurring and spiked challenge species, but adding a challenge species to a feed stream may sometimes lessen the impact of both variation in water quality and instrument drift over time. This more sensitive method of detection is particularly advantageous when regulations or costs inhibit higher feed concentration. For example, a detection system that includes concentrating with high recovery hyperfiltration or UF membrane would allow more economical use of small fluorescent particles, and fluorescent particles having >0.005 micron diameter may be used as surrogates for viruses. At present, use of fluorescent microspheres has been stated as too expensive for system integrity tests.

In another preferred embodiment the ratio of feed to permeate flow rates for the high recovery apparatus be known so that absolute concentrations in the sampling stream can be calculated. Therefore, it is desirable that permeate flow and either feed or reject flow be measured. However, if the high recovery apparatus is operated in a relatively stable manner, it is also possible that results of different measurements may be compared on a relative basis. For instance, useful information may be obtained from the changing time profile within a permeate stream that results from introducing a pulse of challenge species into the feed. Similarly, comparisons may usefully be made from approximate differences in challenge leakage between modules, vessels, or trains within a filtration system.

Figure 5:
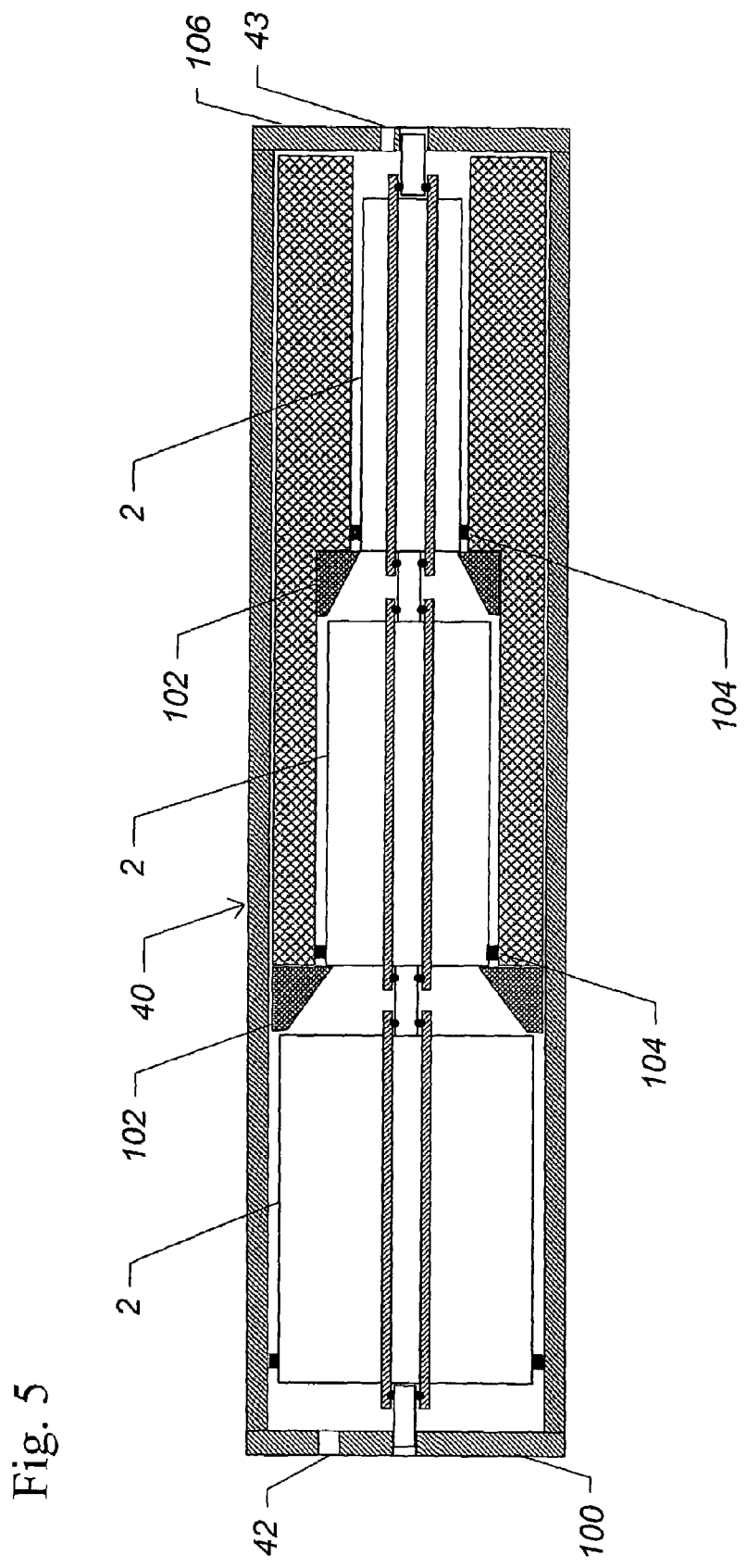
FIG. 5 illustrates a vessel containing three modules of decreasing feed spacer cross sectional areas.

In another preferred embodiment the high recovery apparatus include a cross flow feed channel having a substantially decreased cross sectional area at the outlet end as compared to the inlet end. This allows feed velocities to be maintained high despite the very high recoveries desired. High velocities are beneficial for the purpose of minimizing concentration polarization, and a tapered cross-section can further reduce variation in fluid residence times that might otherwise distort a time-varying concentration profile of the reject stream. The cross sectional area preferably decreases by at least a factor five, more preferably by at least a factor of 25. In one embodiment, the high recovery apparatus has a staged design, with the reject from multiple modules providing the feed to a single module. In another embodiment illustrated in FIG. 5, modules having different feed spacer cross sectional areas may be combined in series within a pressure vessel (40). The permeate sampling stream enters the vessel from a port (42) at the vessel's inlet end (100) and is concentrated by filtration within modules (2) of successively smaller feed channel cross sectional areas. It is desired that a distributor means (102) between modules (2) improves feed flow uniformity within modules (2) and that a brine seal (104) or other means prevents bypass of downstream modules. The concentrated reject stream leaves from a port (43) at the vessel's outlet end (106) and a detector measures its concentration of challenge species. Both this embodiment and the staged design may use either flat sheet or hollow fiber membrane.

In one especially preferred embodiment, a sampling stream to be concentrated and measured, as described above, is removed from a particular region of a vessel's permeate collection region using a probing conduit.

Another aspect of this invention includes simultaneously measuring the concentration of a challenge species from at least four points within a vessel's permeate collection region. Detecting and recording the signal from multiple points improves sensitivity to defects, as will be illustrated in examples. Measurements may be made inside the permeate collection region or multiple sampling streams may be simultaneously extracted with permeate conduits and measurements made outside the permeate collection region. If measurements are performed outside the permeate collection region and permeate samples are extracted from the vessel using a plurality of probing conduits, it is preferred that flows from different permeate conduits are also measured so that the relative time delays between regions can be calculated. Making multiple measurements inside a vessel's permeate collection region is preferable to making multiple measurement with probing conduits because 1) pressure drop within the permeate collection region due to the probe may be reduced, 2) a larger number of sampling points are more easily collected due to space constraints within a standard permeate tube, and 3) time delays associated with propagating down the probing conduits are avoided. Whether measurements are made inside or outside of the permeate collection region, probing a vessel with multiple modules is most easily accomplished when interconnectors between modules do not constrict the diameter for permeate flow. Preferred interconnectors for use with multiple measurement points include those with an axial seal (U.S. Pat. No. 6,632,356) and those with a radial seal that surround the permeate tube.

A preferred device for simultaneously probing at least four points, and more preferably at least ten points, has conductivity cells at each point connected to wires that extend from the permeate tubes and allow electrical signals to leave the vessel. Conductivity cells are at known positions down the length of a vessel and are attached to a support structure that extends axially within the permeate collection region. The probe preferably allows combined conductivity from a specific set of holes within a permeate tube to be substantially separated from that for bulk flow down the permeate tube. ("Substantially separated" means that at least 50% of the liquid measured had passed through a specific set of holes in the permeate tube.) It also preferably includes a conductivity cell located just downstream of an interconnector but upstream of the first hole within the permeate tube of the subsequent module, so that leaks at the interconnector's seal may be identified. (A module's first permeate hole is the most upstream hole, upstream in this case being defined in terms of permeate flow within the tube.) In some designs, the probe may be slid to vary its axial position. Because it is not required to remove several different permeate streams from the vessel, this conductivity probe may require less space within the vessel's permeate collection region than the traditional probe conduit. Therefore, it may remain in place during operation for months without substantially degrading system performance.

Figure 9:
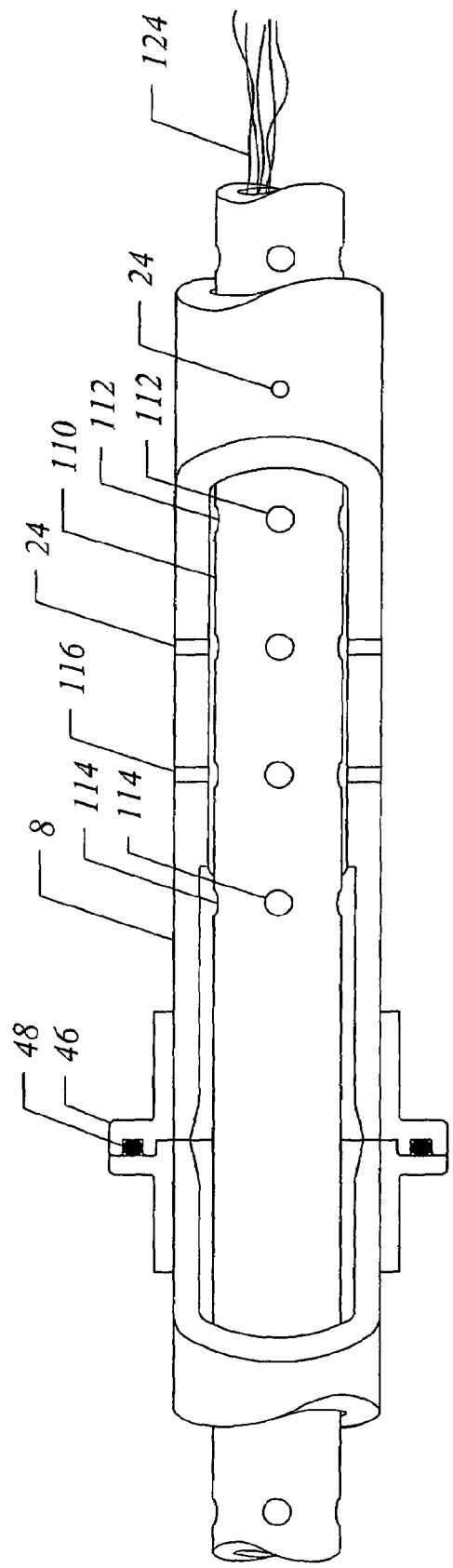
FIG. 9 shows the outer surface for one embodiment of a probe device that may be used to measure challenge concentration at several points within a vessel's permeate collection region.
Figure 10:
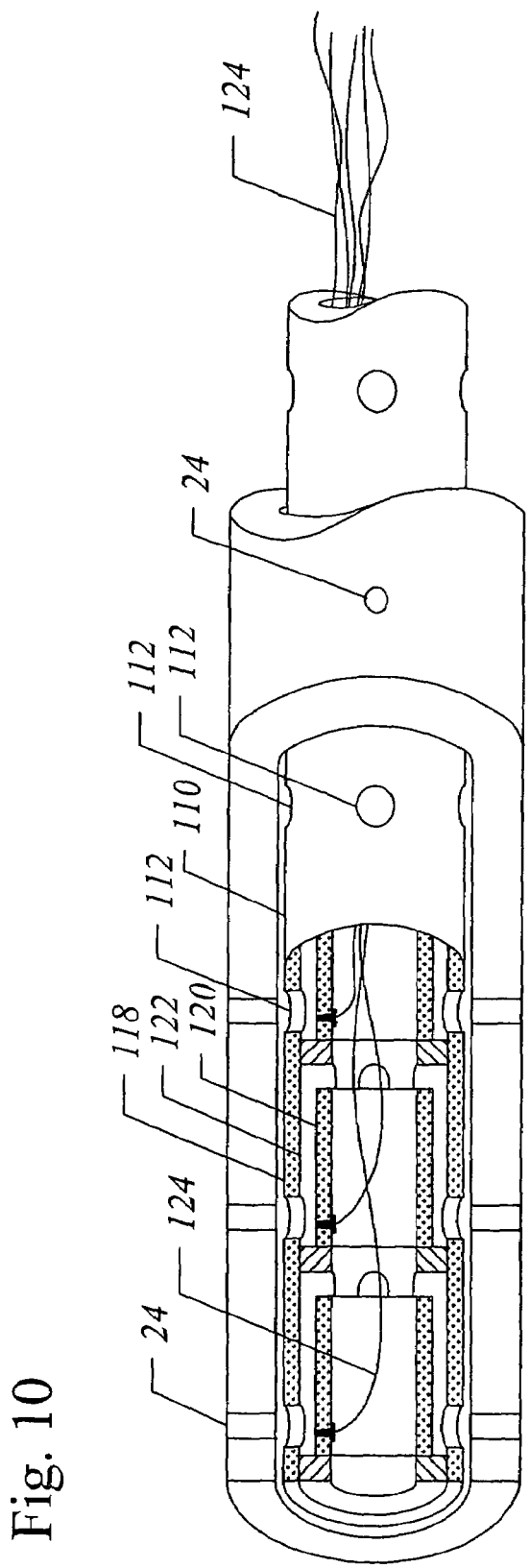
FIG. 10 and FIG. 11 are cut-away views illustrating one preferred embodiment for a probe device that can measure conductivity for multiple positions within a vessel's permeate collection region.
Figure 11:
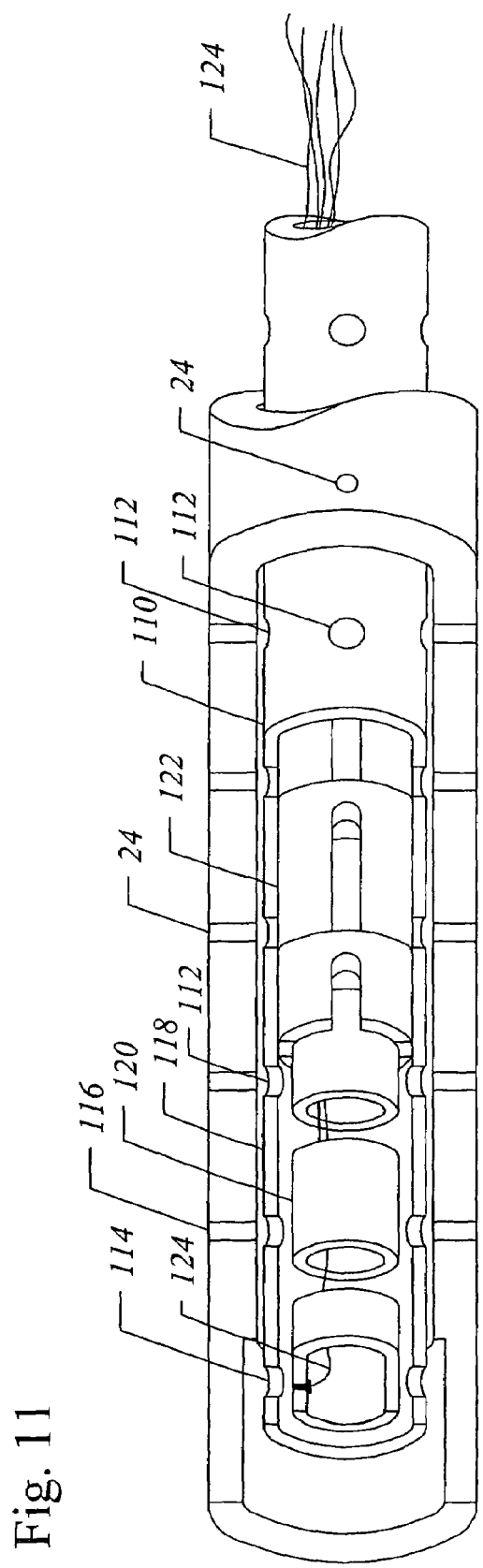

FIGS. 9-11 illustrate one preferred embodiment for the probe device that may be used to measure challenge concentration at several points within a vessel's permeate collection region.

FIG. 9 shows the outer surface (110) of a probe section that extends down the permeate tubes of two adjacent modules. The two modules shown are joined by an axial permeate seal (48) surrounding the permeate tube (8), as described in U.S. Pat. No. 6,632,356, so that the interconnector (46) does not constrict the diameter for permeate flow. Apertures (112) in the outer surface (110) of the probe align with permeate tube holes (24) and support segregation of flow through individual holes (24) from bulk flow within the permeate collection region. The design in FIG. 9 includes additional apertures (114) upstream of one module's first permeate holes (116) to detect leaks in the permeate seal (48).

FIGS. 10 and 11 are cut-away views that illustrating one preferred means for segregating bulk flow within the permeate collection region from permeate flow through specific sets of holes. In this embodiment, each cell consists of an outer electrode (118), an inner electrode (120), and an insulating spacer (122) that separates the two electrodes and provides a path for permeate flow through the cell. An outer pipe with apertures serves as both the outer electrode (118) and as a support structure for probe. Wires (124) attached to the cylindrical inner electrodes extend to one end of the probe and allow conductivity within each cell to be measured outside of the vessel. In the arrangement shown, a conductivity cell upstream of a module's first permeate tube hole (116) detects leaks in a permeate seal. Conductivity from other cells is substantially due to that from liquid passing through a set of four permeate tube holes, each at the same axial position down the module. FIG. 9 shows two modules in series. However, with modifications to truncate the probe, this arrangement of cells is particularly advantageous in testing the integrity of a single module.

The following examples disclose specific illustrative examples which by no means limit the scope of the invention.

EXAMPLE 1

A spiral wound brackish water hyperfiltration module was run at 67 psi using a pure water feed. For thirty seconds, the feed to the module was switched to a solution of 2000 ppm $MgSO_4$. The feed source was switched back to pure water, and the resulting pulse in feed challenge concentration, as determined by conductivity measured at the input end of the module, had a FWHM of less than 40 seconds. The relative challenge concentrations within the feed pulse is shown as #0 in FIG. 6.

Within the permeate tube of the spiral wound module, a probe segregated permeate from selected regions corresponding to individual holes in the permeate tube. The probe comprised twelve conduits (0.0125" outer diameter) of more than one meter in length. The presence of these many conduits within the permeate tube would have substantially increased backpressure on the module, although this increase was not measured.

Figure 6:
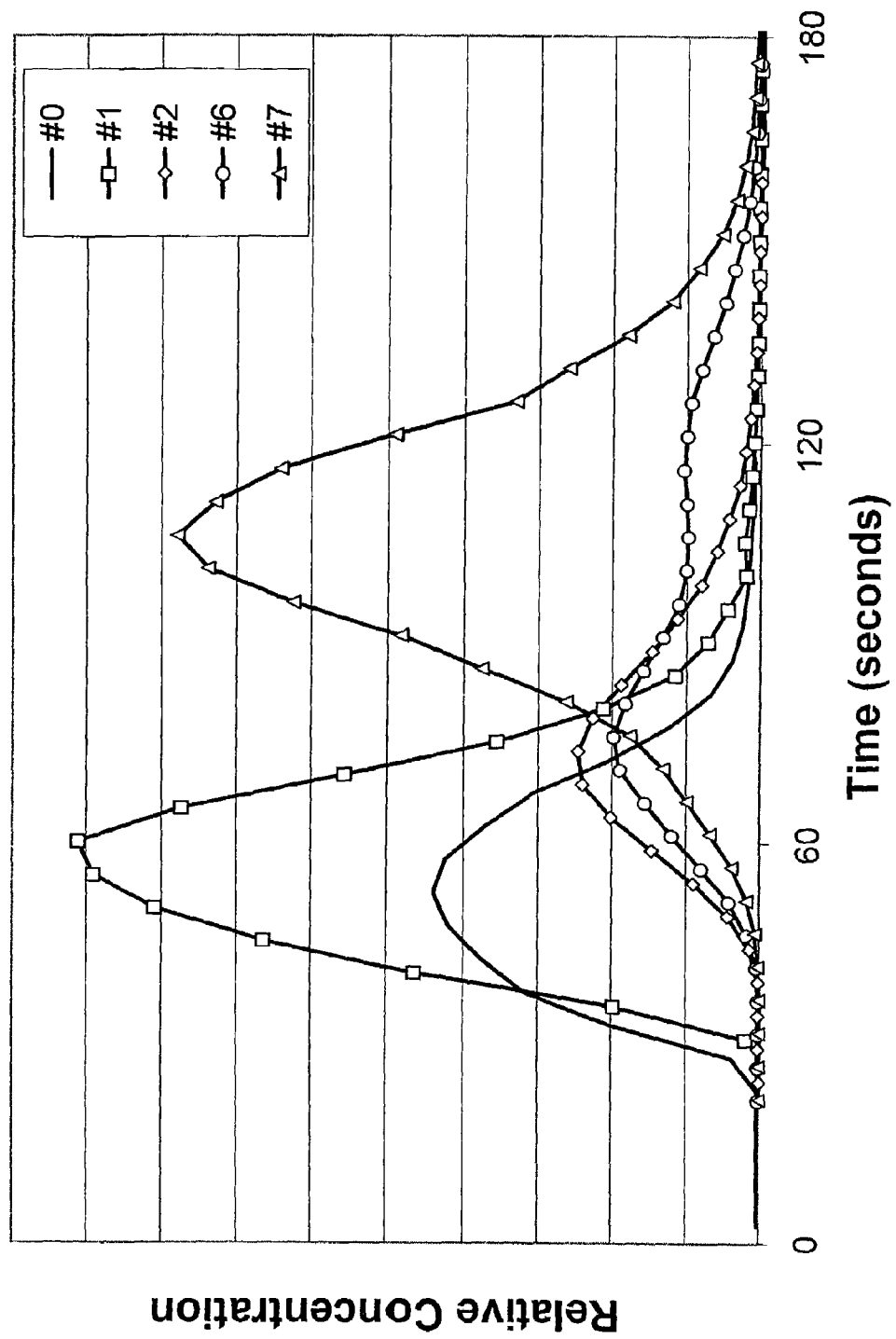
FIG. 6 is a graph showing the change with time of challenge species concentration in the feed and permeate. The permeate liquid has been sampled from four different regions within a module's permeate collection tube (#1, #2, #6, and #7). The time-dependent feed concentration (#0) has been reduced in magnitude to appear on a similar scale. Similarly, as compared to the relative concentrations from the other three permeate positions, the relative concentrations from position #1 have been reduced by a factor of 20.

FIG. 6 shows the relative concentrations measured by conductivity sampled from four different regions (positions #1, #2, #6 and #7) within the permeate tube. Flow rates through individual conduits were measured, so that the time delay associated with flowing through the small conduits was known. The time zero has been adjusted for each conduit position to remove this delay.

This module was known to have an insert leak at one end. At position #1, permeate was collected from the hole in the permeate collection tube nearest the inlet end of the module, and this position demonstrated the greatest increase in permeate concentration. Position #1 also showed the earliest peak in time, and its time profile is similar to that for the feed liquid. Position #2 corresponded to a region just one inch away from position #1. Despite their proximity, position #2 does not demonstrate the early increase in concentration, and its time profile was very similar to that observed in other "intact" sections of the module. This module also had a defect at the back glue line, and its impact is seen at positions #6 and #7. Position #7 shows a large increase in permeate concentration at a late position in time, well removed from that for "intact" regions of the module. Position #6 segregated permeate from just one inch away, but it did not demonstrate as substantial an increase in concentration. The bimodal profile from position #6 had a first maximum that was slightly shifted from that for an "intact" region and a second peak that eluted at a much later time. As compared to the peak from position #7, the second peak from position #6 resulted later because the leak caused different fluid velocities in different regions of the permeate carrier sheet.

EXAMPLE 2

A spiral wound seawater hyperfiltration module (FilmTec SW30-2540) having an insert leak at one end was tested using the method of the invention using a pulse of challenge species in the feed. The pulse was created by temporarily replacing pure water with a challenge species feed solution of 1700 ppm $MgSO_4$. The FWHM of the pulse was slightly less than 40 seconds. The applied pressure during the test was 227 psi.

The 40 inch long module was tested with two different orientations. In a first test, the module was oriented relative to the pressure vessel so that the insert leak was at the inlet end. All permeate was removed from that inlet end of the module. In a second test, the module was reversed so that the leak was at the end farthest away from both the inlet end and the permeate removal end. The second test demonstrated a delay of ten seconds in the peak position relative to the peak position observed in the first test. We believe this delay was due to this change in orientation of the module.

EXAMPLE 3

Twenty seawater spiral wound modules (FILMTEC SW30-2540) were tested using the method of the invention at 150 psi applied pressure with a challenge pulse. Pure water was replaced temporarily with a pulse having FWHM less than 40 seconds. At its peak concentration, this feed pulse was approximately 3% $MgSO_4$, resulting in an osmotic strength of about 100 psi. Conductivity was used to measure concentration of the permeate and was recorded as a function of time during this pulse test.

Figure 7:
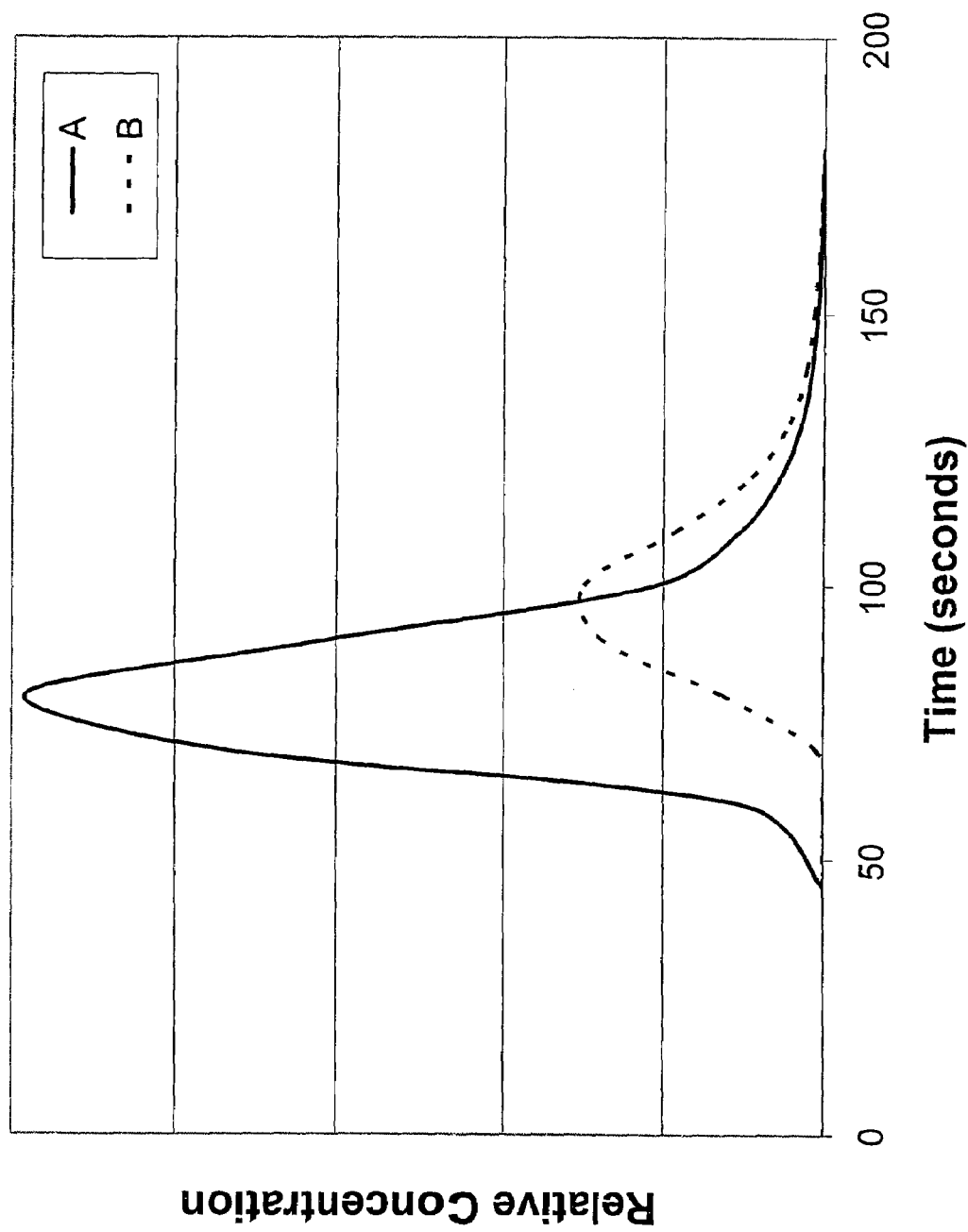
FIG. 7 shows the concentration profiles for permeate from two modules. The module (A) with a known leak demonstrated higher peak concentration and an earlier peak elution time, as compared to a typical intact module (B).

"Intact" modules, as determined from later standard seawater tests (3.2% NaCl, 800 psi), demonstrated similar time profiles for $MgSO_4$ in the permeate. FIG. 7 shows a time profile for a leaking module (A) and for an "intact" module (B). The leaking module demonstrated higher peak concentration and an earlier peak elution time, both individually indicative of a defect. In this example, improved sensitivity to defects can also be obtained by subtracting the time profile for a typical "intact" module from that observed for the leaking module.

EXAMPLE 4

Two FILMTEC NF-2540 modules were tested using the manufacturer's standard test for that module type (2000 ppm $MgSO_4$ at 150 psi applied pressure). The $MgSO_4$ passage for Module C was 0.5% and for Module D it was 1.6%. Using a bubble test, we determined that Module D had an insert leak.

A challenge species was introduced to each module at an applied pressure of 75 psi with a pulse of sodium sulfate having FWHM less than 40 seconds. Sodium sulfate was chosen because it has good rejection by intact membrane and because its osmotic pressure is relatively high for a given concentration of sulfate species. Each module was tested twice, once with a maximum feed concentration in the pulse of 0.7% and once with a maximum feed concentration in the pulse of 1.5%. Because a 1.5% solution of sodium sulfate has an osmotic pressure greater than 75 psi, the permeate line was submerged in a reservoir of permeate solution during the test; this prevented the permeate line from emptying due to reverse flow during the pulse.

Figure 8:
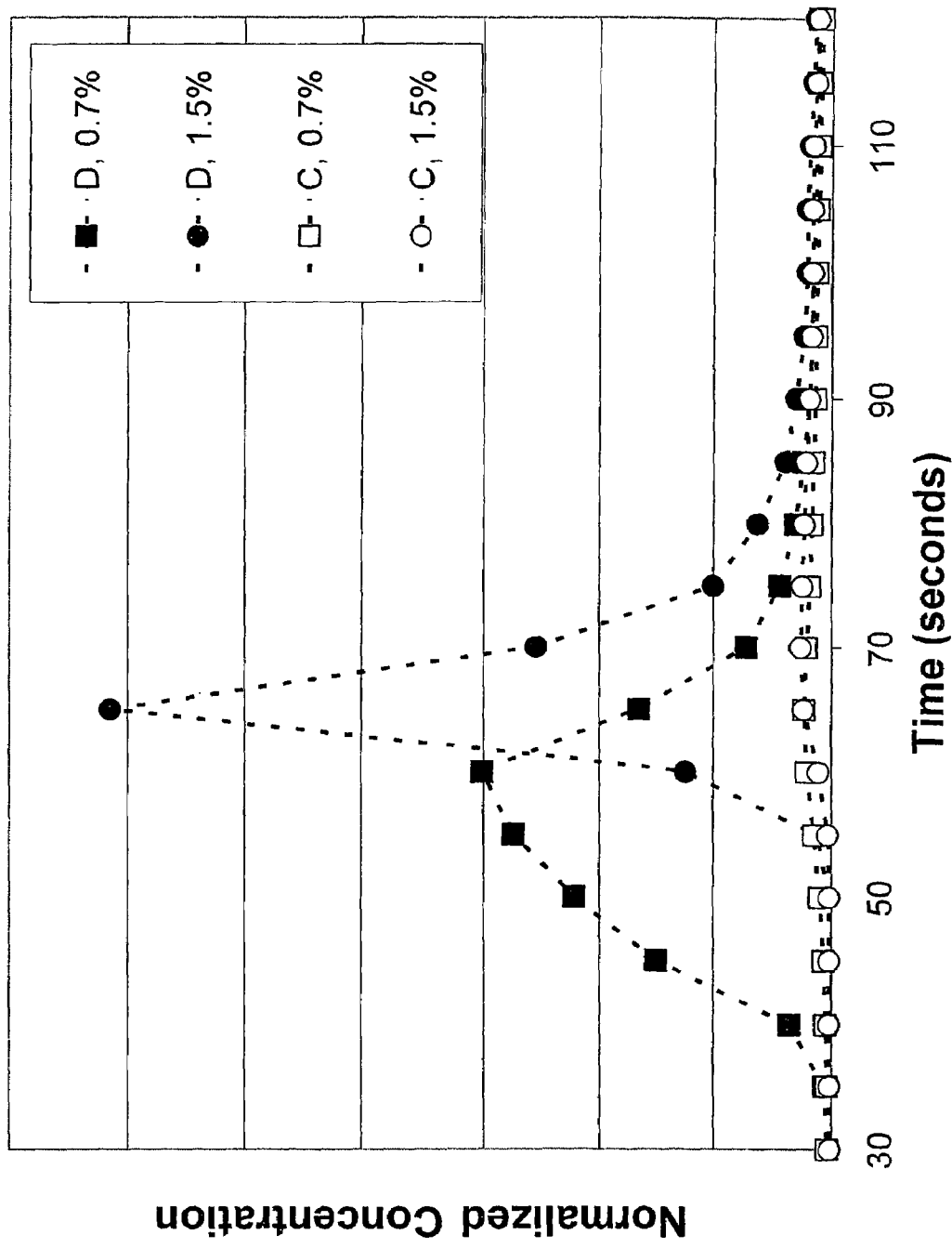
FIG. 8 compares normalized permeate profiles for two NF modules, one "intact" module (C) and one with a leak (D). Pulse tests were done with two concentrations, 0.7% and 1.5% sodium sulfate, and normalized relative concentrations for the permeates have been calculated by dividing measured concentrations by the maximum feed concentration for each test.

FIG. 8 shows results of the pulse tests at both conditions. Relative time-dependent, normalized permeate concentrations were calculated by dividing measured permeate concentrations by the maximum feed concentration in the test. Data for permeate concentrations were obtained by measuring permeate conductivity at 5 second intervals. FIG. 8 illustrates that this interval was too long to accurately quantify the maximum peak height for Module D at 1.5%. Even so, this example showed a greater maximum normalized concentration when Module D was tested with 1.5% sodium sulfate. The ratio of maximum normalized concentration for Module D (leaking) to Module C ("intact") was also greater for tests with 1.5% sodium sulfate.

EXAMPLE 5

A brackish water module (FILMTEC TW30-2540) was tested for steady-state salt passage using standard test conditions, (225 psi, 0.2% NaCl) and then also using a pulse test of the invention. The pulse test was performed by switching reservoirs for 30 seconds while maintaining 150 psi applied pressure to result in a feed pulse of slightly greater than 30 seconds FWHM. The pulse test was performed by temporarily replacing pure water with 3% $MgSO_4$, and conductivity of the permeate was measured and recorded as a function of time.

The steady-state salt passage measured by the standard test 0.48%, and the pulse test resulted in a permeate conductivity at peak of 91 μmho. A pin was used to create a small defect in one of the module leaves and the tests were performed again. The standard test showed a small increase in salt passage, to 0.75% passage, but the pulse test resulted in a surprisingly large conductivity at peak of 1246 μmho. The minimum allowed rejection for TW30-2540 modules using the standard test is 2%, so the standard test would not have picked up this defect.

EXAMPLE 6

Figure 12:
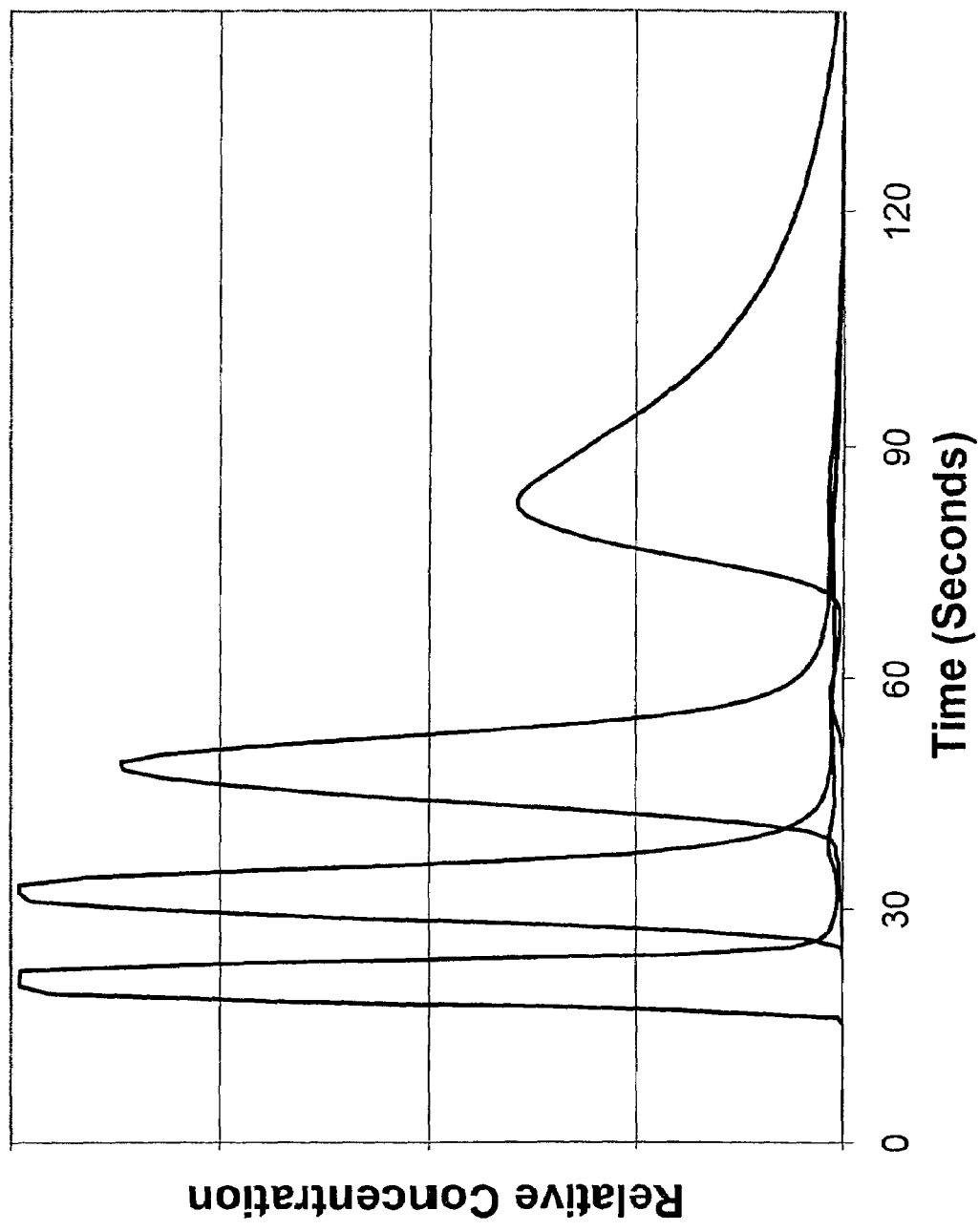
FIG. 12 shows the concentration profiles for permeate from a vessel containing three brackish water modules, one of which has a leak at one end, near the o-ring sealing surface. Different orientations and ordering of modules within the vessel are evidenced in the peak elution time.

An o-ring leak was simulated at the end of one module (FILMTEC TW30-2540) by creating a small hole through the permeate tube wall near that end. Passage of NaCl for that module during a standard test increased from 0.6% to 2.6%. This module and two similar, but undamaged, modules were loaded in series into a pressure vessel. The time required for the leading edge of the feed pulse to traverse from inlet to outlet end in the first of three elements (i.e. the damaged element) was approximately 10 seconds; and slightly longer times were estimated for the latter two elements in series. The system was examined with a pulse test of the invention by switching from RO feed water to MgSO4 challenge solution for 5 seconds; The vessel has a cross-flow configuration, allowing permeate to exit at the same end as the feed inlet. Permeate was taken off the feed inlet end of the vessel. The position and orientation of the damaged module was then moved within the vessel, and a new pulse test was performed. Rerunning the test with the damaged module in a different position continued so that the impact from four potential leak positions could be examined. Two of these positions represented o-ring leaks at module interconnector positions while two positions represented o-ring leaks near vessel end adapter positions. FIG. 12 shows that leaks in each of the four positions caused a different time dependent permeate signal.

EXAMPLE 7

Figure 13:
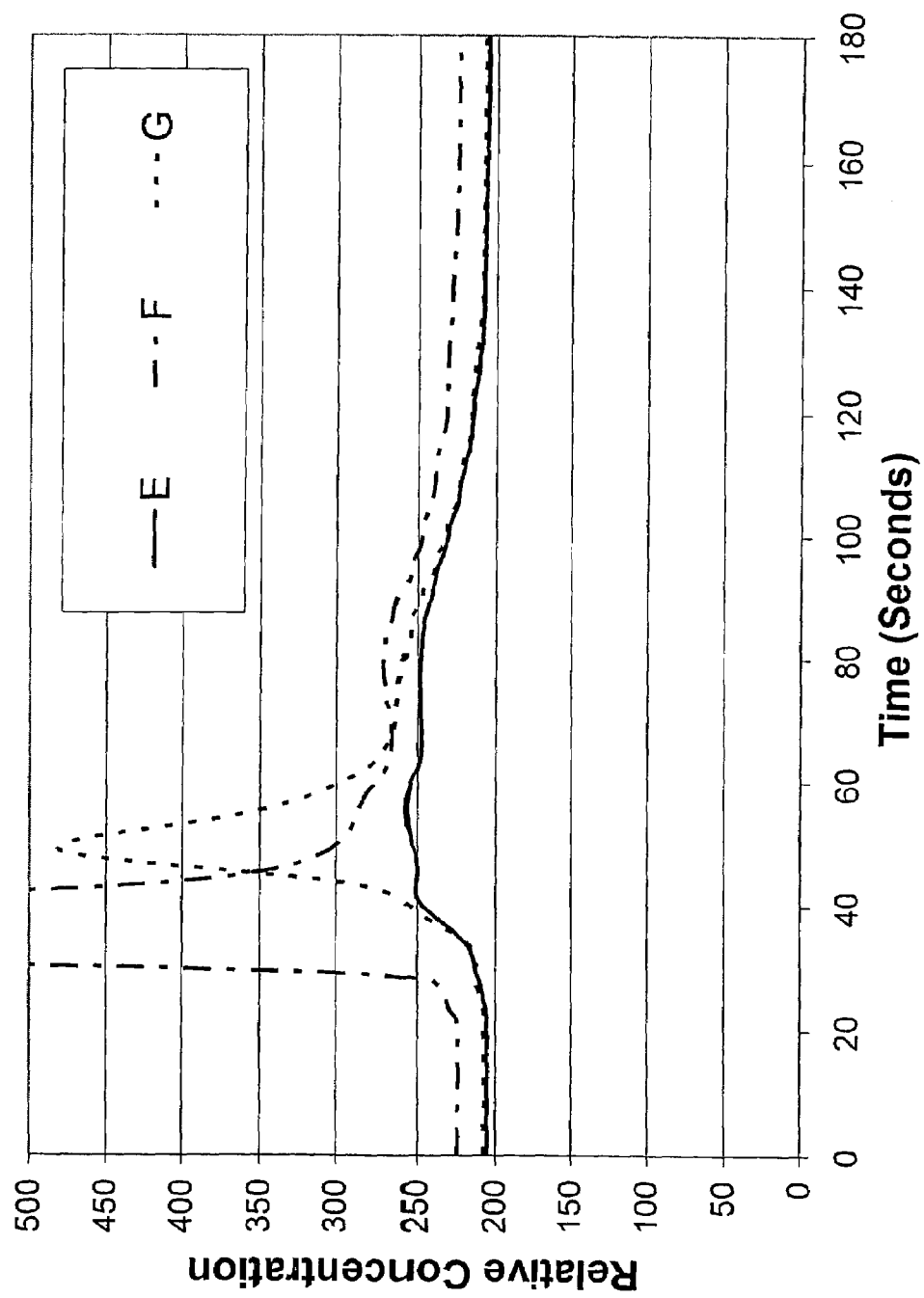
FIG. 13 shows the concentration profiles for permeate from a vessel containing three nanofiltration modules, before and after leaks were induced in one module. A five-second pulse resulted in responses to leaks that were more concentrated in time than the response observed for an intact system.

Three nanofiltration modules were loaded in series into a pressure vessel and operated at 19.3 L/m2/hr average, 60 psi, and 33% recovery. The feed water contained a variety of ions and had a conductivity of 569 μmho. During continuous operation, the combined permeate from these nanofiltration modules had a conductivity of 207 μmho. A pulse test of the invention was performed by introducing a five-second pulse of sodium sulfate. FIG. 13 shows the resulting time-dependent permeate conductivity for the original system (E), and also for the same system after leaks were subsequently created at one o-ring (F) and at the back end of one leaf (G). Although the induced leaks caused little change in the permeate conductivity measured during standard operation, as indicated at the left and right edges of the graph, the impact of each leak was demonstrated during the pulse test. Because each leak was concentrated within a short time, whereas passage through "good" modules is spread over a longer time, sensitivity to leaks was increased.

EXAMPLE 8

Figure 14:
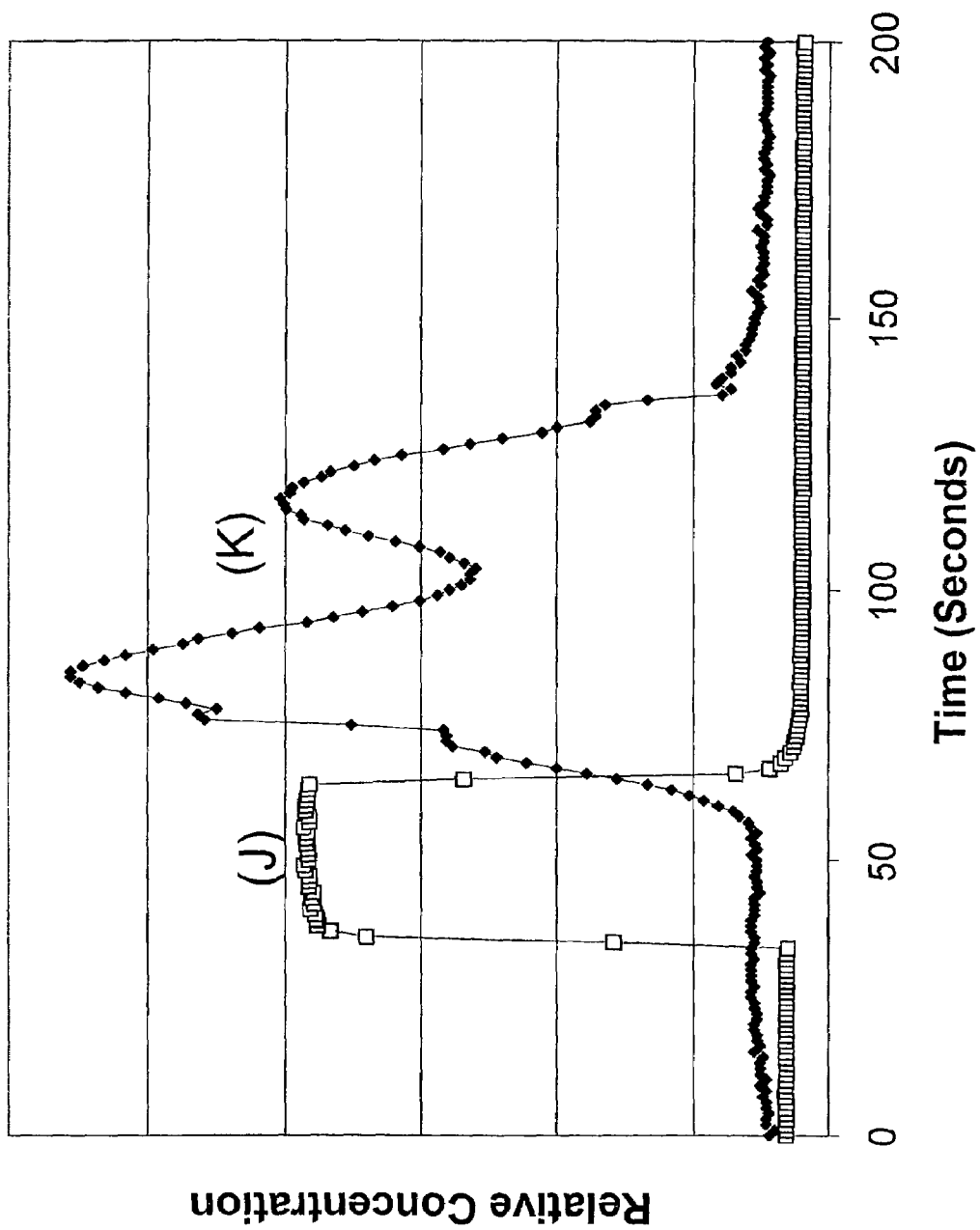
FIG. 14 shows a graph of relative challenge concentration in the feed verses time and the resulting time-dependent concentration profile for permeate from a module. Although total passage of $MgSO_4$ or NaCl would not have suggested a defect, an unintentional leak near the back of a membrane leaf was discovered because of the resulting double-humped permeate profile.

A FILMTEC BW400 module was examined using a pulse of MgSO$_4$ having a FWHM of 30-seconds. The relative concentrations within the feed pulse (J) and the resulting time-dependent permeate profile (K) are shown in FIG. 14. In the figure, permeate signals are multiplied by a factor of 100. By comparing the permeate profile to that resulting from "good" modules, we recognized that the first peak in time corresponds to passage of MgSO$_4$ through "good" membrane, and the second peak in time was due to a defect. This module had better than average NaCl rejection in a standard test, and the total MgSO$_4$ passage after the pulse was within a normal range for the pulse test. However, the shape of the time-dependent permeate signal indicated a leak, and this was verified by autopsy of the module.

We claim:

1. A process for detecting defects in a membrane filtration system having at least one spiral wound hyperfiltration module in a vessel comprising the three sequential steps of:
   a. passing a first feed liquid across the surface of a membrane while applying pressure to said first feed liquid so that a permeate solution and a reject solution are produced;
   b. introducing a second feed liquid under pressure, said second feed liquid containing a challenge species, the concentration of said challenge species being at least twice as high in said second liquid as compared to said first liquid, and wherein said challenge species is selected from at least one of: i) a divalent anion, and ii) a fluorescent particle of a diameter greater than 0.005 microns;
   c. introducing a third feed liquid under pressure, wherein the successive introduction of said second and third feed liquids result in a pulse of challenge species characterized by a concentration profile in time for said challenge species having FWHM of less than four minutes;

and further comprising:
   d. detecting and recording the relative concentration of said challenge species within said permeate solution as a function of time, and
   e. evaluating the integrity of said filtration system by comparing the recorded time dependent concentration of said challenge species with said permeate solution to a reference.

2. The process of claim 1 wherein said pulse of challenge species within said module is characterized by a FWHM of less than forty seconds and said relative concentration of said challenge species within said permeate solution is detected and recorded at intervals of less than 2 seconds.

3. The process of claim 2 wherein said pulse of challenge species within said module is characterized by a FWHM of less than five seconds and said relative concentration of said challenge species within said permeate solution is detected and recorded at intervals of less than 1 seconds.

4. The process of claim 2 wherein said filtration system comprises a vessel containing at least three hyperfiltration modules in series.

5. The process of claim 1 wherein the osmotic pressure of said second feed liquid is greater than the osmotic pressures for both said first and said third feed liquids, and the net driving potential at the surface of said membrane is made negative by introduction of said second feed liquid.

6. The process of claim 1 wherein the pulse of challenge species has a leading edge resulting from introduction of said second feed liquid, and the FWHM of the pulse of challenge species is less than the time required for the leading edge of the pulse of challenge species to traverse the length of the module.

7. The process of claim 2 wherein said reject solution is physically segregated at times corresponding to high concentration of said challenge species in said reject solution.

8. The process of claim 7 wherein said challenge species in said segregated reject solution is used to produce a subsequent pulse of challenge species that is passed across the surface of said membrane.

9. The process of claim 1 wherein a representative sample volume of said permeate solution is concentrated using a high recovery membrane apparatus so that the concentration of challenge species is increased by a factor of at least twenty prior to the step of detection.

10. The process of claim 2 wherein said reference is obtained after at least one earlier test of the same system.

11. The process of claim 2 wherein said reference is obtained after testing at least three essentially equivalent systems.

12. The process of claim 2 wherein said reference is obtained after running a computer program that estimates the time dependent permeation of challenge species that would result if no defects were present in the filtration system.

13. The process of claim 1 wherein said process further comprises measuring the relative concentrations of said challenge species from at least four points within said vessel's permeate collection region.

14. The process of claim 13 wherein said relative concentrations are detected and recorded at intervals of less than 10 seconds using at least four conductivity cells located within said vessel's permeate collection region; wherein said filtration system comprises a vessel containing at least three hyperfiltration modules in series.

15. The process of claim 13 wherein said relative concentrations are detected and recorded at intervals of less than 10 seconds using at least ten conductivity cells located within said vessel's permeate collection region; wherein said filtration system comprises a vessel containing a single hyperfiltration module.

16. The process of claim 1 wherein said challenge species is a fluorescent particle of diameter greater than 0.005 microns.

17. The process of claim 2 wherein said filtration system comprises a vessel containing a single hyperfiltration module and wherein the osmotic pressure of said second feed liquid is greater than the osmotic pressures for both said first and said third feed liquids, and the net driving potential at the surface of said membrane is made negative by replacement of said first feed liquid by said second feed liquid.

* * * * *